US00RE38918E

(19) United States
(12) Reissued Patent
Svensson et al.

(10) Patent Number: US RE38,918 E
(45) Date of Reissued Patent: Dec. 13, 2005

(54) SYSTEM AND METHOD FOR POWER-EFFICIENT CHARGING AND DISCHARGING OF A CAPACITIVE LOAD FROM A SINGLE SOURCE

(75) Inventors: Lars G. Svensson, Lund (SE); William C. Athas, Torrance, CA (US); Jeffrey G. Koller, Torrance, CA (US)

(73) Assignee: University of Southern California, Los Angeles, CA (US)

(21) Appl. No.: 09/758,631

(22) Filed: Jan. 10, 2001

Related U.S. Patent Documents

Reissue of:
(64) Patent No.: 5,473,526
Issued: Dec. 5, 1995
Appl. No.: 08/231,637
Filed: Apr. 22, 1994

U.S. Applications:
(63) Continuation of application No. 08/986,327, filed on Dec. 5, 1997, now Pat. No. Re. 37,552.

(51) Int. Cl.[7] ..... H02M 3/07
(52) U.S. Cl. ..... 363/60; 307/109
(58) Field of Search ..... 363/60, 61, 58, 363/59; 320/166; 307/110, 109, 106

(56) References Cited

U.S. PATENT DOCUMENTS 3,603,898 A * 9/1971 Dawson et al. ..... 333/173
3,654,537 A * 4/1972 Coffey ..... 320/166
3,836,906 A 9/1974 Ando et al.
4,082,430 A * 4/1978 Schulthess et al. ..... 345/87
4,107,757 A 8/1978 Masuda et al. ..... 361/235
4,109,192 A * 8/1978 Burbank et al. ..... 320/166
4,328,525 A * 5/1982 Allen et al. ..... 361/152
4,594,589 A * 6/1986 Ohba et al. ..... 345/79
4,605,999 A * 8/1986 Bowman et al. ..... 363/19
4,707,692 A * 11/1987 Higgins et al. ..... 345/204
4,802,739 A * 2/1989 Iwamoto ..... 345/87
4,818,981 A * 4/1989 Oki et al. ..... 345/92
4,862,113 A * 8/1989 Buhler et al. ..... 331/117 R
4,893,117 A * 1/1990 Blomley et al. ..... 345/96
4,920,474 A * 4/1990 Bruning et al. ..... 363/97
5,095,223 A * 3/1992 Thomas ..... 307/110
5,339,236 A * 8/1994 Tamagawa ..... 363/59
5,400,028 A 3/1995 Schlig

* cited by examiner

*Primary Examiner*—Adolf D. Berhane
(74) *Attorney, Agent, or Firm*—McDermott Will & Emery LLP

(57) ABSTRACT

A system and method for efficiently charging and discharging a capacitive load from a single voltage source. The system includes a brat switch for selectively connecting the voltage source to the load and a second switch for selectively providing a short across the load as may he common in the art. A particularly novel aspect of the invention resides in the provision of plural capacitive elements and a switching mechanism for selectively connecting each of the capacitive elements to the load whereby the load is gradually charged or discharged. In the illustrative embodiment, the switching mechanism includes a set of switches for selectively connecting each of the capacitive elements to the capacitive load and a switch control mechanism for selectively activating the switches.

69 Claims, 4 Drawing Sheets

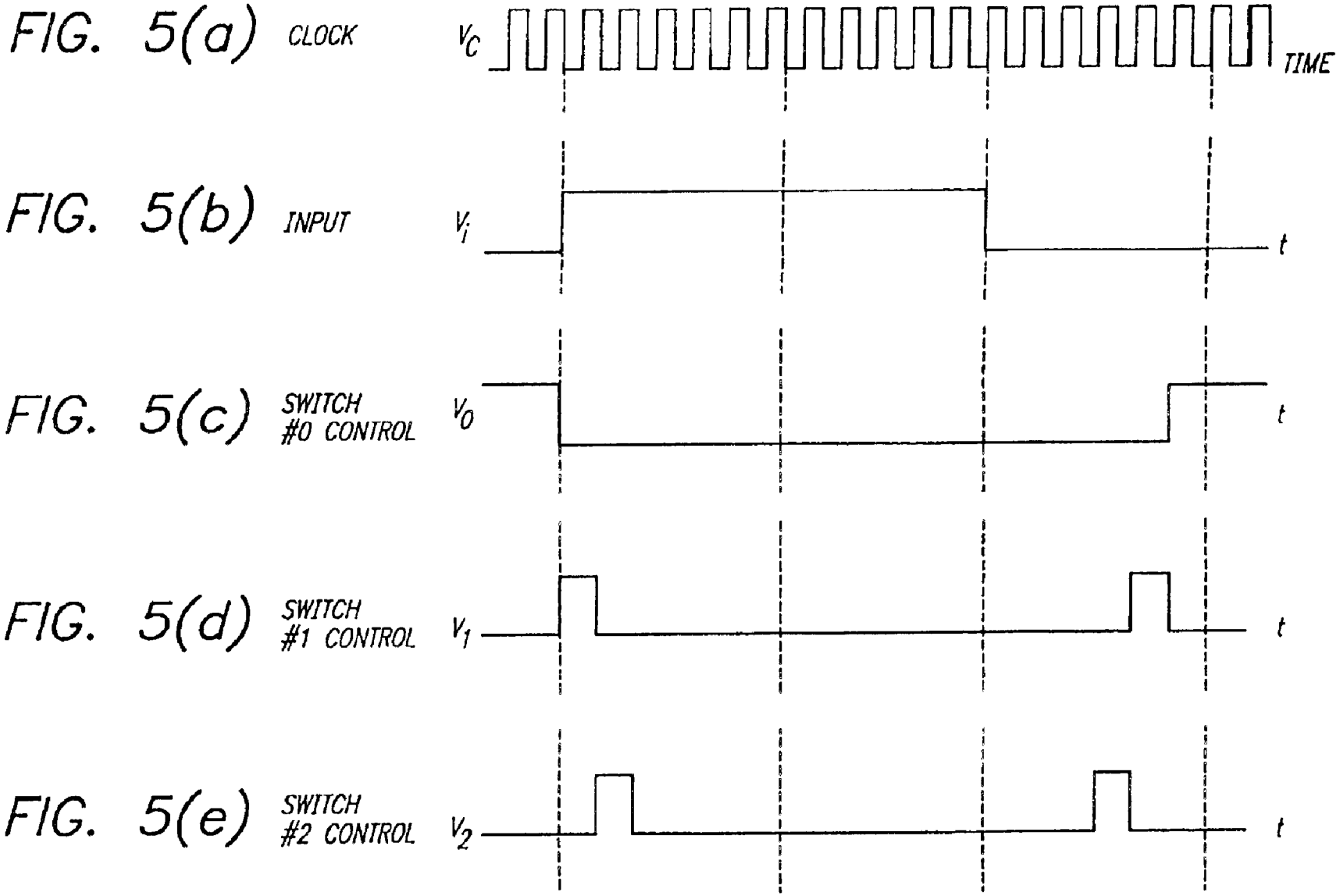
FIG. 5(a) CLOCK
$V_C$
TIME
FIG. 5(b) INPUT
$V_I$
t
FIG. 5(c) SWITCH #0 CONTROL
$V_0$
t
FIG. 5(d) SWITCH #1 CONTROL
$V_1$
t
FIG. 5(e) SWITCH #2 CONTROL
$V_2$
t

SYSTEM AND METHOD FOR POWER-EFFICIENT CHARGING AND DISCHARGING OF A CAPACITIVE LOAD FROM A SINGLE SOURCE

Matter enclosed in heavy brackets [ ] appears in the original patent but forms no part of this reissue specification; matter printed in italics indicates the additions made by reissue.

*CROSS-REFERENCE TO RELATED APPLICATION*

*This application and Reissue application Ser. No. 08/986,327, filed Dec. 5, 1997 (now U.S. Patent No. RE37,552, issued Feb. 19, 2002) are both reissue applications for U.S. Pat. No. 5,473,526, issued Dec. 5,1991. This application is a continuation of U.S. Pat. No. RE37,552.*

This invention was made with government support under DABT-63-92-C-0052 awarded by ARPA. The government has certain rights in the invention.

BACKGROUND OF THE INVENTION

1. Field of the Invention

The present invention relates to electronic circuits and systems. More specifically, the present invention relates to power dissipation in electrode circuits and systems.

2. Description of the Related Art

Power dissipation of electronic circuitry is an important design consideration for many applications. Power dissipation provides a measure of the efficiency of the system. The efficiency of the system impacts the design of the power supply for the system. That is, low efficiency leads to higher costs due to the waste of energy and the need for larger power supplies.

For battery powered systems, power dissipation limits battery life. This necessitates larger batteries which increases the cost and weight of the system while limiting the applicability thereof. As an example, consider coronary pacemakers where power dissipation is a critical concern due to the difficultly of accessing the battery for replacement and the cost and inconvenience associated with the use of larger batteries.

In addition, the dissipated energy is released in the form of heat. Accordingly, systems which exhibit considerable power dissipation often require measures such as heat sinks to protect or cool system components from the heat created by the circuit. The use of heat sinks and the like adds to the cost, size and weight of the system and thereby limits the utility of same.

For the CMOS (complementary-oxide semiconductor) based system, used widely in the design of computers, digital logic circuits and the like, capacitive effects are primarily responsible for the dissipation of power. Such capacitive effects arise due to junction capacitances within semiconductor devices, intended capacitances between lines connecting the circuit to external devices and the capacitance of a load.

In accordance with conventional teachings, power dissipation is directly related to the operating frequency (f), the capacitance (C) and the square of the voltage ($V^2$) applied to the capacitive element.

In addition to the elimination of unnecessary capacitances and the reduction of the switching frequency to the lowest value that supports the functional specification of the circuit, most prior approaches to the problem have focused on reducing the voltage applied to the capacitive elements. However, in addition to costly interfacing issues, attempts to lower the voltage of digital processors and the like have been limited by the fact that the trend is to higher processing speeds which cannot be attained at arbitrarily low operating voltages.

Thus, there is an ongoing need in the art for a system and technique for minimizing the power dissipated by a digital system.

SUMMARY OF THE INVENTION

The need in the art is addressed by the present invention which, in a most general sense, provides a system and method for efficiently charging and discharging a capacitive load from a single voltage source. The inventive system includes a first switch for selectively connecting the voltage source to the load and a second switch for selectively providing a short across the load as may be common in the art. A particularly novel aspect of the invention resides in the provision of plural capacitive elements and a switching mechanism for selectively connecting each of the capacitive elements to the load whereby the load is gradually charged or discharged.

In the illustrative embodiment, the switching mechanism includes a set of switches for selectively connecting each of the capacitive elements to the capacitive load and a switch control mechanism for selectively activating the switches.

DESCRIPTION OF THE INVENTION

Illustrative embodiments and exemplary applications will now be described with reference to the accompanying drawings to disclose the advantageous teachings of the present invention, While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof.

Most of the power dissipation in digital CMOS circuits is due to repeated chug" and discharging of capacitive loads including those internal to the circuit end those associated with the output signals.

Figure 1:
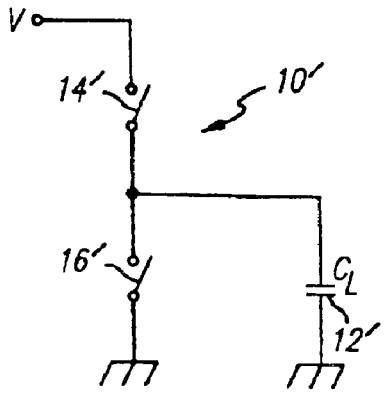
FIG. 1 PRIOR ART
FIG. 1 is a simplified representation of a conventional driver for a capacitive load.

FIG. 1 is a simplified representation of a conventional driver for a capacitive load. The load $C_L$ represents the capacitance of a load and the interlead capacitance of the lines connecting the driver 10' to the load 12'. The load 12' is charged to the supply voltage V by connecting the load 12' to the power rail via a first switch 14'. In practice, the switch 14' may be a metal-oxide semiconductor field-effect transistor (MOSFET) which has a nominal "on" resistance. When the switch 14' is closed, a charge CV passes through the resistance of the switch 14'. The voltage drop across the resistance varies from an initial value of V to a final value of zero, so the average voltage drop V' traversed by the charge is V/2, if the capacitance is linear. The energy dissipated is:

$$E_{conv}=QV^1=CV\ (V/2)=CV^2/2 \quad [1]$$

A similar argument applies to the discharge process, so a complete conventional charge-discharge cycle dissipates all the energy provided by the power supply, $QV=CV^2$.

In accordance with the present teachings, power dissipation is reduced by charging the capacitance of the load $C_L$ in several steps. This is illustrated in FIG. 2

Figure 2:
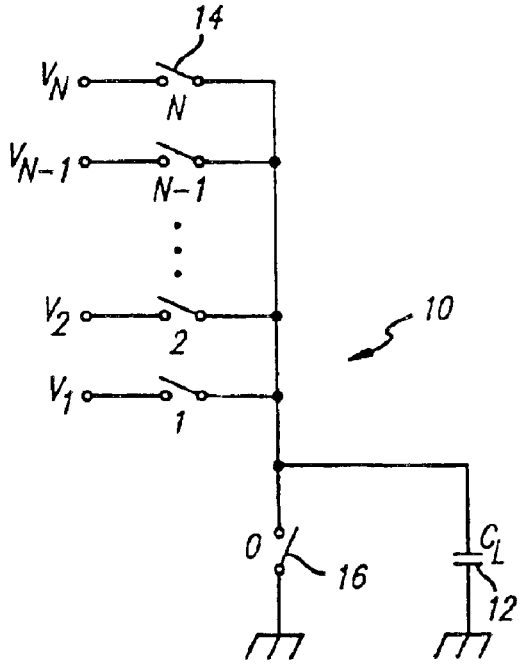
FIG. 2 PRIOR ART
FIG. 2 shows a system for charging the load capacitance by several steps and thereby reducing power dissipation.

FIG. 2 shows a system 10 for charging the load capacitance by several steps and thereby reducing power dissipation. Here, a bank of supply voltages $V_1$ to $V_N$ are used to charge the load 12. The voltages of the supplies are evenly distributed between ground and $V_N$ so that the voltage difference between any two adjacent supplies is the same. Each of the voltages is selectively applied to the load 12 by N switches including the first switch 14 and N−1 additional switches. Between charge cycles, switch 0 is closed. To charge the load, switch 0 is opened and the supplies $V_1$ through $V_N$ are connected to the load in succession by selectively closing the switches, that is, by momentarily closing switch 1, opening switch 1, momentarily closing switch 2 etc. To discharge the load, the supplies $V_{N-1}$ through $V_1$ are switched in in reverse order. Then switch 0 is closed connecting the output to ground.

If N steps are used, the dissipation per step is again given by the transferred charge and the average voltage drop across isle switch resistance:

$$E_{step}=QV'=(CV/N)\ (V/2N)=CV2/2N^2 \quad [2]$$

To charge the capacitance all the way to the supply voltage V, N steps are used, so the total energy dissipation is:

$$\begin{aligned} E_{stepwtan} &= N * E_{step} \quad [3] \\ &= N * CV^2/2N^2 \\ &= CV^2/2N \\ &= E_{conv}/N \end{aligned}$$

Again, a full charge-discharge cycle will cause twice the dissipation of the charging only. Thus, according to this simplified analysis, charging by several steps reduces the energy dissipation per charge-discharge cycle and thereby the total power dissipation, by a factor of N.

The multiple supply voltages of FIG. 2 may be generated with a battery stack. For equipment to powered by batteries or when the desired voltage increment is not a multiple of the battery cell voltage, a power supply unit would seemingly have to generate these multiple supply voltage with an associated cost in expense, complexity and power dissipation.

Figure 3:
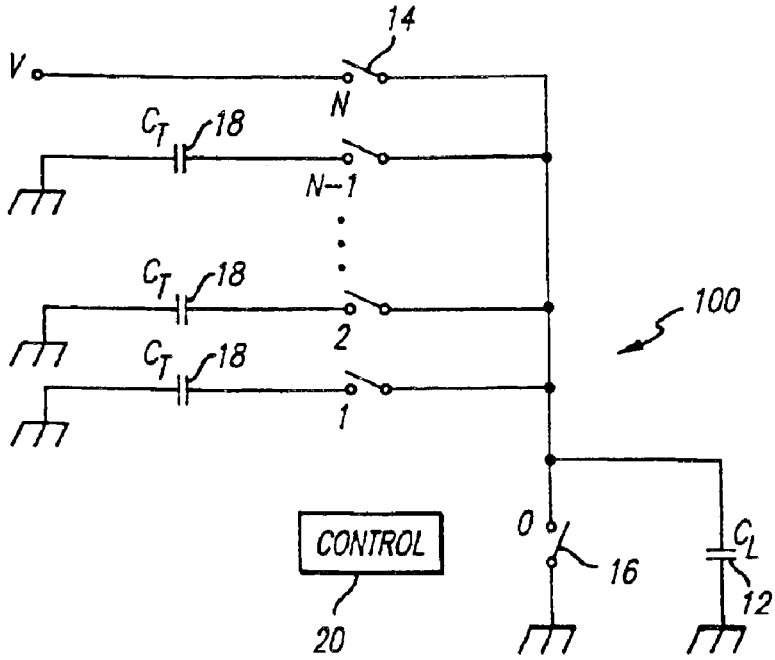
FIG. 3 is a simplified schematic of a preferred embodiment of the circuit of the present invention for reducing the power dissipation of a capacitive load.

FIG. 3 is a simplified schematic of a preferred embodiment of the circuit of the present invention for reducing the power dissipation of a capacitive load. The circuit 100 is essentially identical to that of FIG. 2 with the exception that the supplies $V_1$–$V_{N-1}$ are replaced with a corresponding number of capacitors $C_T$ 18 which will be referred to as "tank" capacitors. Each tank capacitor $C_T$ has a capacitance which is much, much larger (e.g. an order of magnitude) than the load capacitance $C_L$. Switch operations are sequenced by a control circuit 20.

Figure 4:
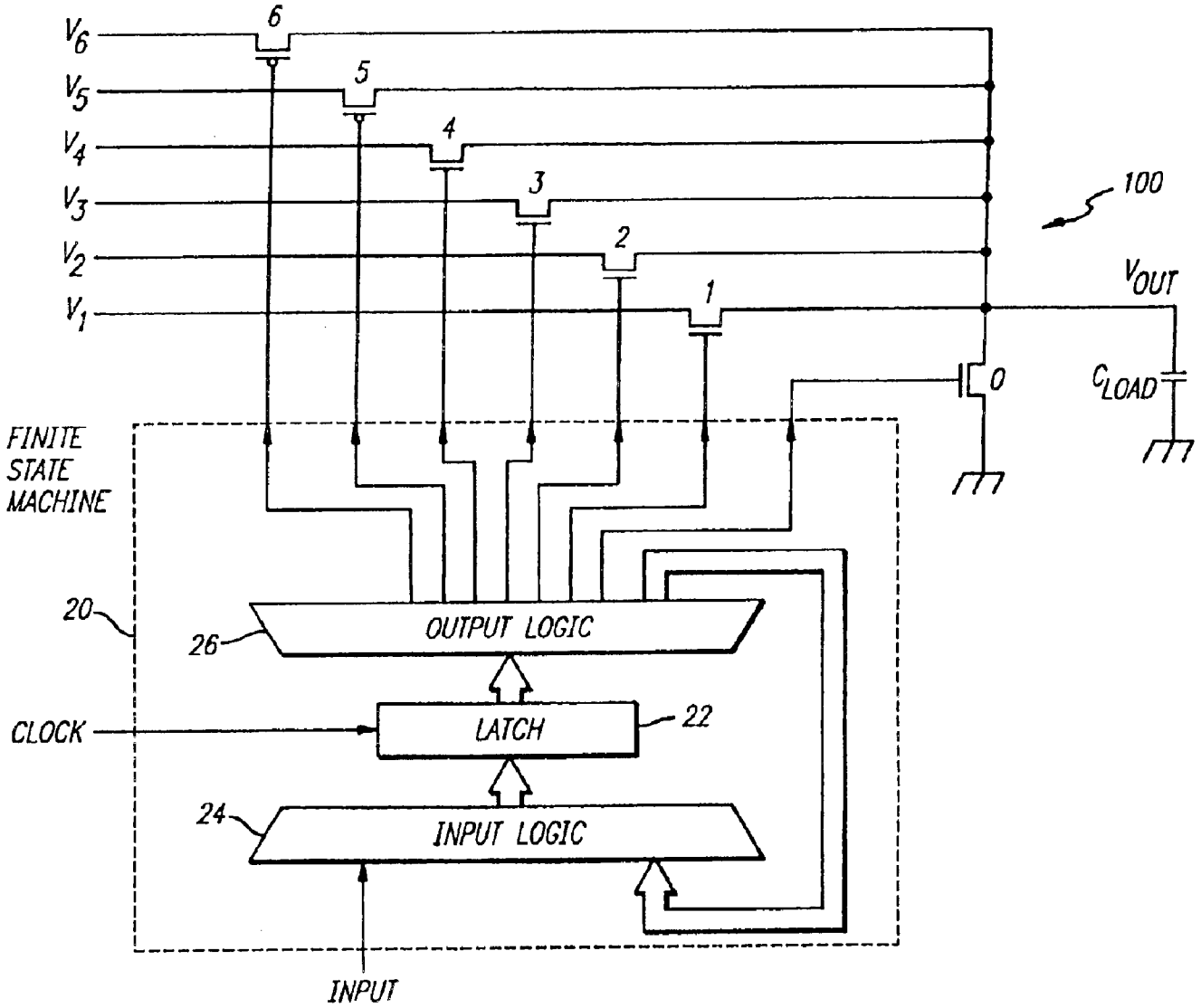
FIG. 4 is a diagram showing the control circuit of the driver constructed in accordance with the teachings of the present invention.

FIG. 4 is a diagram showing the control circuit 20 interconnected to plural MOSFET switches for an N=6 implementation of the driver constructed in accordance with the teachings of the present invention. In FIG. 4, the tank capacitors 18 are eliminated for simplicity. The control signals may be provided by the circuit 20 or may be supplied by a host microprocessor. The control circuit 20 may be implemented in several configurations. For example, the control circuit may be implemented with a microprocessor or with a shift register and a counter. In the alternative, a latch 22 and input and output logic circuits 14 and 26, respectively, may be used as shown in FIG. 4. The input and output loge circuits may be designed by a computer aided logic design program of which several are currently available. If a computer aided logic design program is used, the desired outputs would be specified in response to the expected input signals. The program would then design the logic circuits.

Timing signals are provided by a system clock (not shown) through the latch 22. In practice, the clock rate should be at least (N+1) times the output signal rate. In the preferred embodiment, switches 0–4 are implemented with n-channel MOSFET devices. Switches 5 and 6 are implemented with p-channel devices.

Figures 5F, 5G, 5H, 5I, 5J:
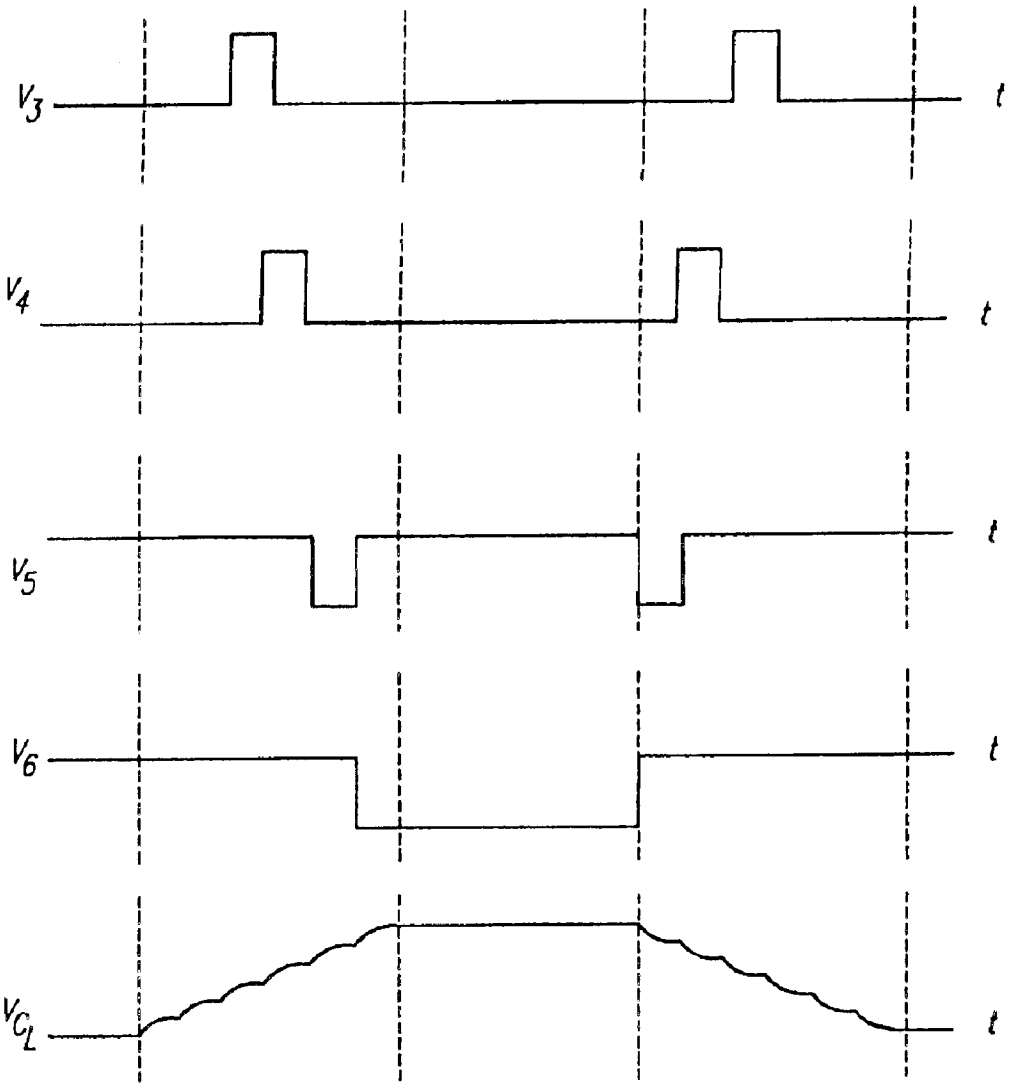
FIG. 5 is a timing diagram which illustrates the operation of the driver of the present invention.

FIG. 5 is a timing diagram which illustrates the operation of the driver 100 of the present invention. In FIG. 5(a), the clock pulse are shown. The input signal is shown in FIG. 5(b). FIGS. 5(c)–(i) show the controls for switch 0–6 and FIG. 5(j) shows the output at the load $C_L$.

The operation of the circuits of FIGS. 3 and 4 is essentially the same as that of FIG. 2. That is, in the initial standby condition switch 0 is closed and them is no charge on any of the capacitors in the system. Next, when an input pulse is to be transferred to the load, switch 0 is opened and switch 1 is closed. Since there is no charge on the load, $C_L$ nor on any of the tank capacitors $C_T$, there will be no charge transfer through any of the switches as each is closed, in turn, momentarily. When the first switch 14 is closed, a charge is applied to the load 12.

On the trailing edge of input pulse, a discharge cycle is initiated by when the switches are momentarily closed in reverse order Thus, switch N is opened and switch N−1 is closed Then switch N−1 is opened and switch N−2 is closed and etc. On the closure of switch N−1, the associated tank capacitor will receive most of the charge on the load capacitance. Each capacitor down the line will receive a lower charge than the immediately proceeding capacitor. After switch 1 opens, switch 0 closes to complete the cycle dumping the remaining charge on the load $C_L$ to ground. Thus, over several cycles the tank capacitors will approach their steady state voltage, for example, the (N−1)th through 1st tank capacitor may have charges of say 5, 4, 3, 2 and 1 volts respectively. Than, at the beginning of the next cycle, on the closure of the first switch, the voltage on the first tank capacitor is applied to the load, then the voltage on the second capacitor is applied to the load and so on. Thus, in the example, first 1 volt is applied to the load, then 2 volts, then three volts and etc. As a result, the voltage on the load will gradually increase as shown in FIG. 5(j).

The circuits of FIG. 3 and 4 will provide the same power dissipation reduction as that of FIG. 2, but without multiply supply lines and without complicating the power supply. This is illustrated by the following analysis. Assume that each tank capacitor $C_T$ is charged to the voltage of the corresponding supply of FIG. 2 and that the load capacitance $C_L$ is discharged The load capacitance is charged by closing and opening switches 1 through N in succession. Each tank capacitor (and the power supply) delivers a charge given by:

$$q=C_L V/N \quad [4]$$

Since the tank capacitors are much larger than the load, the tank voltages do not change significantly, so the dissipation in the switches will be the same as for the case in FIG. 2, where the supply voltages are constant. To discharge the load capacitance, switches N−1 through 0 are closed and opened in succession. During the discharge, each tank capacitor receive a charge of the same size as that delivered during charge phase, and an equally sized charge is dumped to ground via switch 0. Over the full charge-discharge cycle, only the power supply injects any charge into the circuit. No net charge is drawn from any tank capacitor, so the tank voltages do not change.

The voltages of the tank capacitor bank are self-stabilizing. To appreciate this, assume that the voltage of one of the tank capacitors is slightly higher than it should be. Then, the charge delivered by this tank capacitor during the charging of the load will be somewhat larger then that given by equation [4], since the "step" from the voltage below is now slightly larger. During the discharge phase, the step from the voltage above is slightly smaller and the charge received is therefore smaller as well. Therefore, over the full cycle, a net decrease of the charge on the storage capacitor occurs, which causes a decrease in the capacitor voltage. The initial deviance is automatically counteracted.

Even if the tank capacitor voltages differ from the "correct" values, the circuit will work logically correctly, since each charging (discharging) cycle ends by connecting the load to be supply rail (ground). Voltage deviations simply bring higher dissipation. This happens during start-up, before the tank voltages have had time to converge to the even distribution between the supply voltage and ground.

The implementation coat of a driver such as that shown in FIG. 3 is determined by the tank capacitors, the switches, the mechanism controlling the switches, and the interconnections of same. Note that all extra interconnections are local. As for the conventional case, only one connection to the power supply is needed. Also, several drivers may share the same capacitor bank and part of the control mechanism.

The problem of maintaining the appropriate voltages on the tank capacitors is obviated by the fact that the capacitor voltages will converge automatically to the desired voltages No additional circuitry is required. Only one supply line most be routed to the chip and the power supply need not be any more complicated than a conventional supply. In practice, the tank capacitors would be located off-chip.

For a CMOS implementation, the following design procedure may be followed to provide a driver configuration which exhibits minimal power dissipation.

Equation [3] indicates that dissipation decreases monotonically with increasing N. The number N cannot, however, be usefully made arbitrarily large because each step requires that a switch be turned on and off, which itself causes dissipation. Also, the energy used to drive each switch depends on the width of the device, which should be just enough to allow the charging to complete before the next step commences. Then, for a given total allowable charging time "T", these is sat optimal number of steps and a set of optimal device sizes which lead to minimal total dissipation determined as follows.

Again, consider the circuit in FIG. 3 and same the gates of the switch devices we driven conventionally. The load is charged and discharged once; the energy needed to drive the gates of the switch devices is.

$$E_{sw} = \left(\sum_{i=1}^{N} C_i + \sum_{i=0}^{N-1} C_i\right)V^2 \quad [5]$$

Allot each step one Nth of the total charging time T. Then:

$$T/N=mR_iC_L \quad [6]$$

Here, m is the number of RC time constants spent waiting for each charging step to complete. From equation [6], it is evident that all the switch devices should have equal on-resistance: $R_i=R_{sw}$. Decreasing the on-resistance of device i by increasing the width means increasing the gate capacitance.

$$R_iC_i=\rho_i \quad [7]$$

$\rho_i$ is a quality measure of the switch. It varies with i, since the bulk-to-channel and gate-to-channel voltages are different for different switches. Combining equations [5], [6], and [7] yields:

$$E_{sw} = \frac{Nm}{T}\left(\sum_{i=1}^{N} \rho i + \sum_{i=0}^{N-1} \rho i\right)C_L V^2 \quad [8]$$

Introducing $\overline{\rho}$, a weighted average of ρ, for the different switches:

$$\overline{\rho} = \frac{1}{2N}\left(\sum_{i=1}^{N} \rho i + \sum_{i=0}^{N-1} \rho i\right) \quad [9]$$

If N is sufficiently large, $\overline{\rho}$ is close to the unweighed average of ρ over the entire voltage range. Combining equations [3], [8] and [9] yields the following expression for the total energy dissipation:

$$E_{tot} = \left(\frac{1}{N} + 2N^2 m\frac{\overline{\rho}}{T}\right)C_L V^2 \quad [10]$$

The number N that minimizes $E_{tot}$ is given by:

$$N_{opt} = \sqrt[3]{\frac{T}{4m\overline{\rho}}} \quad [11]$$

The corresponding energy dissipation is:

$$E_{opt} = \frac{3}{2}\sqrt[3]{\frac{4m\overline{\rho}}{T}}\, C_L V^2 \quad [12]$$

It remains to select the value for m. If it is chosen too small, there will still be a significant voltage across a switch when the next switch is to close. Hence, them is an increase in the average voltage across each switch and therefore a dissipation increase (the first term in equation [10] is changed slightly). If on the other hand to is chosen unnecessarily large, time is wasted that could have been used to increase the number of steps. Thus, in general, optimization methods for the value of to vary according to the application, however, one skilled in the at will be able to select a suitable value for to using conventional teachings (e.g., a simulation program).

By using the number of stages given by equation [10], the designer coo minimize the power dissipation of the driver. The minimum is rather shallow, however, so a lower N (as would most often be dictated by practical considerations) will still give a considerable improvement over the conventional case, N=2 already gives almost 50% reduction. Once N and m have been selected, the on-resistance of each switch is given by equation [6]. The corresponding gate capacitance, and thereby the width of the device, is given by equation [7]. The values of ρ for a certain process can be found by circuit simulation or by measuring the on-resistances of test devices of known widths.

Thus, the present invention has been described herein with reference to a particular embodiment for a particular application. Those having ordinary skill in the art and access to the present teachings will recognize additional modifications applications and embodiments within the scope thereof. For example, the switches may be closed in some other sequence as may be appropriate for a given application without departing from the scope of the present invention. In addition, alternative circuit topologies for the network of tank capacitors and switches may be appropriate. The second terminal of the load may be connected to a potentially variable) voltage other than ground.

It is therefore intended by the appended claims to cover any and all such applications, modifications and embodiments within the scope of the present invention.

Accordingly,

What is claimed is:

[1. A system for efficiently charging and discharging a capacitive lad from a single voltage source of a first potential consisting of:

a first switch for selectively charging the load;

a second switch for selectively discharging the load;

plural capacitive elements; and switch means for selectively connecting each of the capacitive elements to the capacitive load to gradually charge or discharge the capacitive load.]

[2. The invention of claim 1 wherein said switch means includes plural third switches connected between said capacitive elements and said load.]

[3. The invention of claim 2 wherein said switch means includes means for selectively activating the first, second and third switches.]

[4. The invention of claim 3 wherein the capacitive load has a first terminal connected to the first switch and a second terminal connected to a source of a second potential.]

[5. The invention of claim 4 wherein the second switch has a first terminal connected to the first terminal of the load and a second terminal connected to said source of a second potential.]

[6. The invention of claim 5 wherein each of the third switches has a first terminal connected to the first terminal of the load and a second terminal connected to a first terminal of an associated one of the plural capacitive elements.]

[7. The invention of claim 6 wherein the means for selectively activating the first, second and third switches includes a finite state machine.]

[8. The invention of claim 7 wherein the finite state machine is designed to receive a clock signal and an input signal and provide selective activation signals for the first, second and third switches in response thereto.]

[9. The invention of claim 8 wherein a second terminal of each of the plural capacitive elements is connected to said source of a second potential.]

[10. The invention of claim 9 wherein each of the capacitive elements has a capacitance which is at least an order of magnitude greater than the capacitance of the load.]

[11. A method for efficiently charging and discharging a capacitive load from a single voltage source including the steps of:

providing a flat switch for selectively connecting the voltage source to the load;

providing a second switch for selectively providing a short across the load;

providing plural capacitive elements;

providing plural third switches for selectively connecting each of the capacitive elements to the capacitive load; and selectively activating the first, second and third switches to gradually charge or discharge the capacitive load.]

*12. An apparatus for driving a capacitive load, comprising:*

*a voltage source; and*

*a switch network,*

*wherein the switch network is operable to electrically connect the capacitive load and the voltage source to drive the load to a first voltage level,*

*wherein the switch network is further operable to electrically connect the capacitive load and a capacitive storage system, and wherein when the capacitive storage system and the capacitive load are electrically connected by the switch network, a voltage level of the capacitive storage system tends to self stabilize to a second voltage level; and*

*wherein the switch network is further operable to cause charge to be transferred from the capacitive storage subsystem to the capacitive load and is still further operable to cause charge to be transferred from the capacitive load to the capacitive storage subsystem.*

*13. An apparatus as claimed in claim 12, wherein the capacitive load comprises a first capacitive element and the capacitive storage system comprises a second capacitive element.*

*14. An apparatus as claimed in claim 12, wherein the capacitive storage system comprises a plurality of capacitive elements.*

*15. An apparatus as claimed in claim 12, wherein when the capacitive storage system and the capacitive load are electrically connected by the switch network, the capacitive storage system and the capacitive load are electrically floating.*

*16. An apparatus as claimed in claim 12, wherein the capacitive load comprises a first capacitive element and the capacitive storage system comprises a second capacitive element, and wherein when the capacitive storage system and the capacitive load are electrically connected by the switch network, the first and second capacitive elements are electrically connected in parallel.*

*17. An apparatus as claimed in claim 12, wherein the capacitive load comprises a first capacitive element and the capacitive storage system comprises a second capacitive element, and wherein when the capacitive storage system and the capacitive load are electrically connected by the switch network, the first and second capacitive elements are electrically connected such that a first terminal of the first capacitive element is electrically connected to a first terminal of the second capacitive element and a second terminal of the first capacitive element and a second terminal of the second capacitive element are electrically connected to a common potential.*

*18. An apparatus as claimed in claim 12, wherein the switch network comprises a plurality of switching elements.*

*19. An apparatus as claimed in claim 12, wherein the switch network comprises a plurality of MOS transistors.*

*20. An apparatus as claimed in claim 12, wherein a capacitance of the capacitive storage system is larger than a capacitance of the capacitive load.*

*21. An apparatus as claimed in claim 12, wherein a capacitance of the capacitive storage system is an order of magnitude larger than a capacitance of the capacitive load.*

*22. An apparatus as claimed in claim 12, wherein the apparatus is a driver.*

*23. An apparatus as claimed in claim 12, wherein the switch network is further operable to electrically connect the capacitive load and the voltage source to drive the capacitive load to a third voltage level wherein when the capacitive storage system and the capacitive load are electrically connected by the switch network the capacitive load settles at a second voltage level between the first and third voltage levels, and wherein during operation of the apparatus the capacitive load is first driven to the first voltage, then subsequently settles at the second voltage level and then is subsequently driven to the third voltage level.*

*24. An apparatus comprising:*

*a capacitive load;*

*a voltage source;*

*a switch network; and*

*a capacitive storage system,*

*wherein the switch network is operable to electrically connect the capacitive load and the voltage source to drive the load to a first voltage level,*

*wherein the switch network is further operable to electrically connect the capacitive load and the capacitive storage system, and wherein when the capacitive storage system and the capacitive load are electrically connected by the switch network, a voltage level of the capacitive storage system tends to self stabilize to a second voltage level, and*

*wherein the switch network is further operable to cause charge to be transferred from the capacitive storage subsystem to the capacitive load and is still further operable to cause charge to be transferred from the capacitive load to the capacitive storage subsystem.*

*25. An apparatus as claimed in claim 24, wherein the capacitive load comprises a first capacitive element and the capacitive storage system comprises a second capacitive element.*

*26. An apparatus as claimed in claim 24, wherein the capacitive storage system comprises a plurality of capacitive elements.*

*27. An apparatus as claimed in claim 24, wherein when the capacitive storage system and the capacitive load are electrically connected by the switch network the capacitive storage system and the capacitive load are electrically floating.*

*28. An apparatus as claimed in claim 24, wherein the capacitive load comprises a first capacitive element and the capacitive storage system comprises a second capacitive element, and wherein when the capacitive storage system and the capacitive load are electrically connected by the switch network, the first and second capacitive elements are electrically connected in parallel.*

*29. An apparatus as claimed in claim 24, wherein the capacitive load comprises a first capacitive element and the capacitive storage system comprises a second capacitive element, and wherein when the capacitive storage system and the capacitive load are electrically connected by the switch network, the first and second capacitive elements are electrically connected such that a first terminal of the first capacitive element is electrically connected to a first terminal of the second capacitive element and a second terminal of the first capacitive element and a second terminal of the second capacitive element are electrically connected to a common potential.*

*30. An apparatus as claimed in claim 24, wherein the switch network comprises a plurality of switching elements.*

*31. An apparatus as claimed in claim 24, wherein the switch network comprises a plurality of MOS transistors.*

*32. An apparatus as claimed in claim 24, wherein a capacitance of the capacitive storage system is larger than a capacitance of the capacitive load.*

*33. An apparatus as claimed in claim 24, wherein a capacitance of the capacitive storage system is an order of magnitude larger than a capacitance of the capacitive load.*

*34. An apparatus as claimed in claim 24, wherein the switch network is further operable to electrically connect the capacitive load and the voltage source to drive the capacitive load to a third voltage level wherein when the capacitive storage system and the capacitive load are electrically connected by the switch network, the capacitive load settles at a second voltage level between the first and third voltage levels, and wherein during operation of the apparatus, the capacitive load is first driven to the first voltage, then subsequently settles at the second voltage level, and then is subsequently driven to the third voltage level.*

*35. An apparatus for driving a capacitive load, comprising:*

*a voltage source; and*

*a switch network,*

*wherein the switch network is operable to electrically connect the capacitive load and the voltage source to drive the load to a first voltage level,*

*wherein the switch network is further operable to electrically connect the capacitive load and a capacitive storage system, and wherein when the capacitive storage system and the capacitive load are electrically connected by the switch network, the capacitive storage system is electrically isolated from the voltage source, and*

*wherein the switch network is further operable to cause charge to be transferred from the capacitive storage subsystem to the capacitive load and is still further operable to cause charge to be transferred from the capacitive load to the capacitive storage subsystem.*

*36. An apparatus as claimed in claim 35, wherein the capacitive load comprises a first capacitive element and the capacitive storage system comprises a second capacitive element.*

*37. An apparatus as claimed in claim 35, wherein the capacitive storage system comprises a plurality of capacitive elements.*

*38. An apparatus as claimed in claim 35, wherein when the capacitive storage system and the capacitive load are electrical connected by the switch network, the capacitive storage system and the capacitive load are electrically floating.*

*39. An apparatus as claimed in claim 35, wherein the capacitive load comprises a first capacitive element and the capacitive storage system comprises a second capacitive element, and wherein when the capacitive storage system and the capacitive load are electrically connected by the switch network, the first and second capacitive elements are electrically connected in parallel.*

*40. An apparatus as claimed in claim 35, wherein the capacitive load comprises a first capacitive element and the*

*capacitive storage system comprises a second capacitive element, and wherein when the capacitive storage system and the capacitive load are electrically connected by the switch network, the first and second capacitive elements are electrically connected such that a first terminal of the first capacitive element is electrically connected to a first terminal of the second capacitive element and a second terminal of the first capacitive element and a second terminal of the second capacitive element are electrically connected to a common potential.*

*41. An apparatus as claimed in claim 35, wherein the switch network comprises a plurality of switching elements.*

*42. An apparatus as claimed in claim 35, wherein the switch network comprises a plurality of MOS transistors.*

*43. An apparatus as claimed in claim 35, wherein a capacitance of the capacitive storage system is larger than a capacitance of the capacitive load.*

*44. An apparatus as claimed in claim 35, wherein a capacitance of the capacitive storage system is an order of magnitude larger than a capacitance of the capacitive load.*

*45. An apparatus as claimed in claim 35, wherein the apparatus is a driver.*

*46. An apparatus as claimed in claim 35, wherein the switch network is further operable to electrically connect the capacitive load and the voltage source to drive the capacitive load to a third voltage level, wherein when the capacitive storage system and the capacitive load are electrically connected by the switch network, the capacitive load settles at a second voltage level between the first and third voltage levels, and wherein during operation of the apparatus, the capacitive load is first driven to the first voltage, then subsequently settles at the second voltage level, and then is subsequently driven to the third voltage level.*

*47. An apparatus comprising:*

*a capacitive load;*

*a voltage source;*

*a switch network; and*

*a capacitive storage system,*

*wherein the switch network is operable to electrically connect the capacitive load and the voltage source to drive the load to a first voltage level,*

*wherein the switch network is further operable to electrically connect the capacitive load and the capacitive storage system, and wherein when the capacitive storage system and the capacitive load are electrically connected by the switch network, the capacitive storage system is electrically isolated from the voltage source, and*

*wherein the switch network is further operable to cause charge to be transferred from the capacitive storage subsystem to the capacitive load and is still further operable to cause charge to be transferred from the capacitive load to the capacitive storage subsystem.*

*48. An apparatus as claimed in claim 47, wherein the capacitive load comprises a first capacitive element and the capacitive storage system comprises a second capacitive element.*

*49. An apparatus as claimed in claim 47, wherein the capacitive storage system comprises a plurality of capacitive elements.*

*50. An apparatus as claimed in claim 47, wherein when the capacitive storage system and the capacitive load are electrically connected by the switch network, the capacitive storage system and the capacitive load are electrically floating.*

*51. An apparatus as claimed in claim 47, wherein the capacitive load comprises a first capacitive element and the capacitive storage system comprises a second capacitive element, and wherein when the capacitive storage system and the capacitive load are electrically connected by the switch network, the first and second capacitive elements are electrically connected in parallel.*

*52. An apparatus as claimed in claim 47, wherein the capacitive load comprises a first capacitive element and the capacitive storage system comprises a second capacitive element, and wherein when the capacitive storage system and the capacitive load are electrically connected by the switch network, the first and second capacitive elements are electrically connected such that a first terminal of the first capacitive element is electrically connected to a first terminal of the second capacitive element and a second terminal of the first capacitive element and a second terminal of the second capacitive element are electrically connected to a common potential.*

*53. An apparatus as claimed in claim 47, wherein the switch network comprises a plurality of switching elements.*

*54. An apparatus as claimed in claim 47, wherein the switch network comprises a plurality of MOS transistors.*

*55. An apparatus as claimed in claim 47, wherein a capacitance of the capacitive storage system is larger than a capacitance of the capacitive load.*

*56. An apparatus as claimed in claim 47, wherein a capacitance of the capacitive storage system is an order of magnitude larger than a capacitance of the capacitive load.*

*57. An apparatus as claimed in claim 47, wherein the switch network is further operable to electrically connect the capacitive load and the voltage source to drive the capacitive load to a third voltage level, wherein when the capacitive storage system and the capacitive load are electrically connected by the switch network, the capacitive load settles at a second voltage level between the first and third voltage levels, and wherein during operation of the apparatus, the capacitive load is first driven to the first voltage, then subsequently settles at the second voltage level, and then is subsequently driven to the third voltage level.*

*58. An apparatus for driving a capacitive load, comprising:*

*a voltage source; and*

*a switch network,*

*wherein the switch network is operable to electrically connect the capacitive load and the voltage source to drive the load to a first voltage level,*

*wherein the switch network is further operable to electrically connect the capacitive load and a capacitive storage system, and wherein when the capacitive storage system and the capacitive load are electrically connected by the switch network, the capacitive storage system and the capacitive load are electrically floating, and*

*wherein the switch network is further operable to cause charge to be transferred from the capacitive storage subsystem to the capacitive load and is still further operable to cause charge to be transferred from the capacitive load to the capacitive storage subsystem.*

*59. An apparatus as claimed in claim 58, wherein the capacitive load comprises a first capacitive element and the capacitive storage system comprises a second capacitive element.*

*60. An apparatus as claimed in claim 58, wherein the capacitive storage system comprises a plurality of capacitive elements.*

*61. An apparatus as claimed in claim 58, wherein when the capacitive storage system and the capacitive load are*

*electrically connected by the switch network, the capacitive storage system and the capacitive load are electrically disconnected from the voltage source.*

*62. An apparatus as claimed in claim 58, wherein the capacitive load comprises a first capacitive element and the capacitive storage system comprises a second capacitive element, and wherein when the capacitive storage system and the capacitive load are electrically connected by the switch network the first and second capacitive elements are electrically connected in parallel.*

*63. An apparatus as claimed in claim 58, wherein the capacitive load comprises a first capacitive element and the capacitive storage system comprises a second capacitive element, and wherein when the capacitive storage system and the capacitive load are electrically connected by the switch network, the first and second capacitive elements are electrically connected such that a first terminal of the first capacitive element is electrically connected to a first terminal of the second capacitive element and a second terminal of the first capacitive element and a second terminal of the second capacitive element are electrically connected to a common potential.*

*64. An apparatus as claimed in claim 58, wherein the switch network comprises a plurality of switching elements.*

*65. An apparatus as claimed in claim 58, wherein the switch network comprises a plurality of MOS transistors.*

*66. An apparatus as claimed in claim 58, wherein a capacitance of the capacitive storage system is larger than a capacitance of the capacitive load.*

*67. An apparatus as claimed in claim 58, wherein a capacitance of the capacitive storage system is an order of magnitude larger than a capacitance of the capacitive load.*

*68. An apparatus as claimed in claim 58, wherein the apparatus is a driver.*

*69. An apparatus as claimed in claim 58, wherein the switch network is further operable to electrically connect the capacitive load and the voltage source to drive the capacitive load to a third voltage level, wherein when the capacitive storage system and the capacitive load are electrically connected by the switch network, the capacitive load settles at a second voltage level between the first and third voltage levels, and wherein during operation of the apparatus, the capacitive load is first driven to the first voltage, then subsequently settles at the second voltage level, and then is subsequently driven to the third voltage level.*

*70. An apparatus comprising:*

*a capacitive load;*

*a voltage source;*

*a switch network; and*

*a capacitive storage system,*

*wherein the switch network is operable to electrically connect the capacitive load and the voltage source to drive the load to a first voltage level,*

*wherein the switch network is further operable to electrically connect the capacitive load and the capacitive storage system, and wherein when the capacitive storage system and the capacitive load are electrically connected by the switch network, the capacitive storage system and the capacitive load are electrically floating, and*

*wherein the switch network is further operable to cause charge to be transferred from the capacitive storage subsystem to the capacitive load and is still further operable to cause charge to be transferred from the capacitive load to the capacitive storage subsystem.*

*71. An apparatus as claimed in claim 70, wherein the capacitive load comprises a first capacitive element and the capacitive storage system comprises a second capacitive element.*

*72. An apparatus as claimed in claim 70, wherein the capacitive storage system comprises a plurality of capacitive elements.*

*73. An apparatus as claimed in claim 70, wherein when the capacitive storage system and the capacitive load are electrically connected by the switch network, the capacitive storage system and the capacitive load are electrically disconnected from the voltage source.*

*74. An apparatus as claimed in claim 70, wherein the capacitive load comprises a first capacitive element and the capacitive storage system comprises a second capacitive element, and wherein when the capacitive storage system and the capacitive load are electrically connected by the switch network, the first and second capacitive elements are electrically connected in parallel.*

*75. An apparatus as claimed in claim 70, wherein the capacitive load comprises a first capacitive element and the capacitive storage system comprises a second capacitive element, and wherein when the capacitive storage system and the capacitive load are electrically connected by the switch network, the first and second capacitive elements are electrically connected such that a first terminal of the first capacitive element is electrically connected to a first terminal of the second capacitive element and a second terminal of the first capacitive element and a second terminal of the second capacitive element are electrically connected to a common potential.*

*76. An apparatus as claimed in claim 70, wherein the switch network comprises a plurality of switching elements.*

*77. An apparatus as claimed in claim 70, wherein the switch network comprises a plurality of MOS transistors.*

*78. An apparatus as claimed in claim 70, wherein a capacitance of the capacitive storage system is larger than a capacitance of the capacitive load.*

*79. An apparatus as claimed in claim 70, wherein a capacitance of the capacitive storage system is an order of magnitude larger than a capacitance of the capacitive load.*

*80. An apparatus as claimed in claim 70, wherein the switch network is further operable to electrically connect the capacitive load and the voltage source to drive the capacitive load to a third voltage level, wherein when the capacitive storage system and the capacitive load are electrically connected by the switch network, the capacitive load settles at a second voltage level between the first and third voltage levels, and wherein during operation of the apparatus, the capacitive load is first driven to the first voltage, then subsequently settles at the second voltage level and then is subsequently driven to the third voltage level.*

* * * * *

UNITED STATES PATENT AND TRADEMARK OFFICE

CERTIFICATE OF CORRECTION

PATENT NO. : RE 38,918 E
APPLICATION NO. : 09/758631
DATED : December 13, 2005
INVENTOR(S) : Lars G. Svensson et al.

It is certified that error appears in the above-identified patent and that said Letters Patent is hereby corrected as shown below:

Column 1,
Lines 11-17, replace with the following:
-- This patent, Reissue application Serial No. 09/986,327, filed December 5, 1997 (now U.S. Patent No. RE 37,552, issued Feb. 19, 2002), and pending Reissue application No. 11/040,608, filed on January 21, 2005 are all reissue applications for U.S. Pat. No. 5,473,526, issued Dec. 5, 1995. This application is a continuation of U.S. Pat. No. RE37,552.--

Signed and Sealed this

Sixth Day of February, 2007

JON W. DUDAS
*Director of the United States Patent and Trademark Office*